July 14, 1959  D. F. THOMAS ET AL  2,894,531
PRESSURE RELIEF VALVE
Filed July 11, 1956
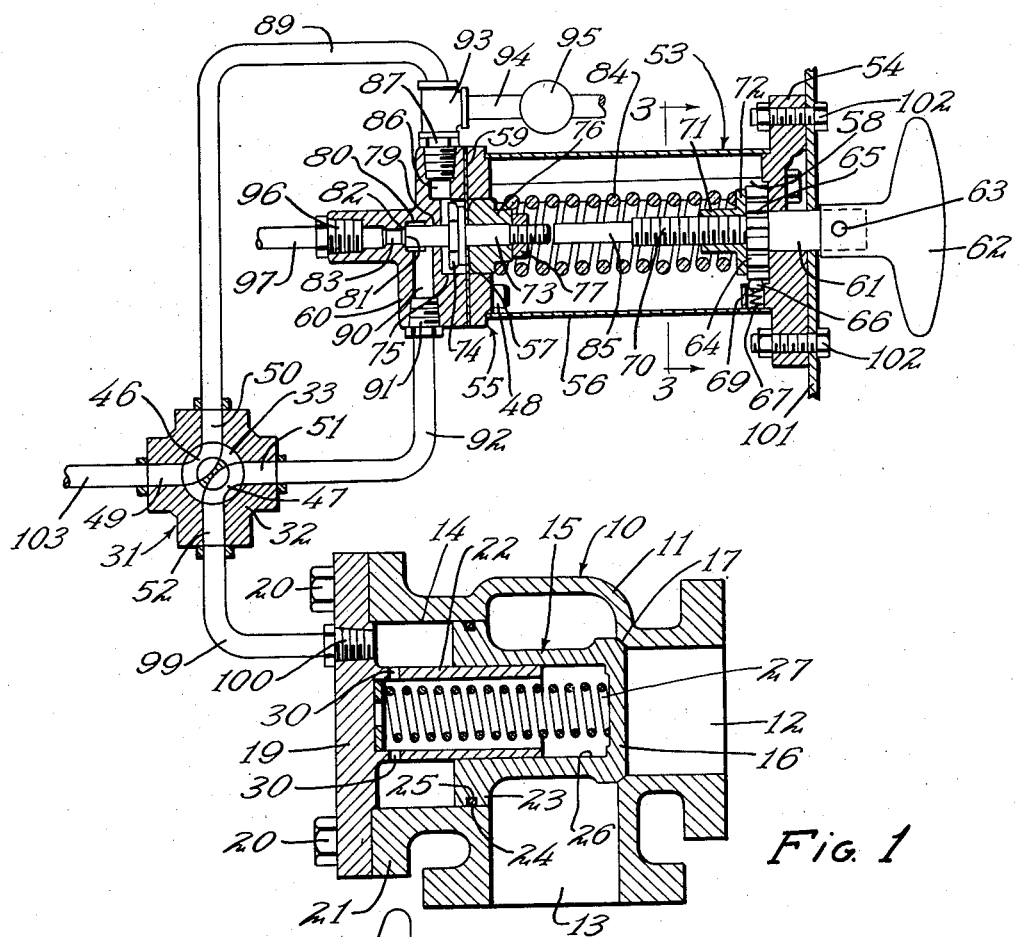
Fig. 1
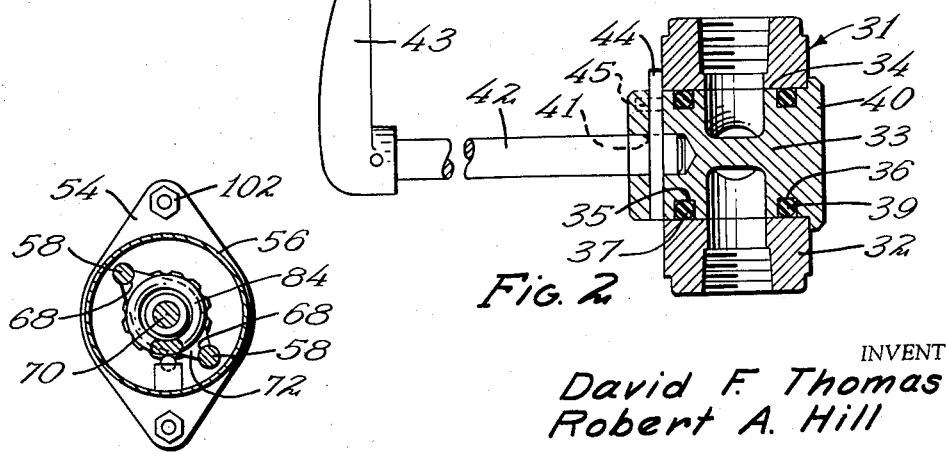
Fig. 2
Fig. 3
INVENTOR
David F. Thomas
Robert A. Hill
BY Robert M. Dunning
ATTORNEY 2,894,531

PRESSURE RELIEF VALVE

David F. Thomas, West St. Paul, and Robert A. Hill, Minneapolis, Minn., assignors to Waterous Company, St. Paul, Minn., a corporation of Minnesota Application July 11, 1956, Serial No. 597,153

1 Claim. (Cl. 137—489)

This invention relates to an improvement in pressure relief valves and deals particularly with a type of pressure relief valve which can be conveniently controlled from a remote point.

Pressure relief valves are usually employed in hydraulic systems in order to avoid injury to the system due to abnormal pressures. For example, a centrifugal pump of the type used in fire fighting apparatus is usually provided with a pressure relief valve which may function in the event the discharge of the pump is closed or in other cases where the discharge of the pump is subjected to abnormal pressures. In this case, as in many other types of equipment, it is convenient to control the relief valve from a remote point so that the pressure at which the valve opens may be varied, and so that the valve may be rendered inoperative when desired.

The relief valve must normally be directly associated with pressure line in order to function quickly and effectively. Where the pilot valve controlling the relief valve is mounted directly adjoining the relief valve, remote control thereof is difficult.

A feature of the present invention lies in the provision of a relief valve controlled by a remotely located pilot valve and four-way valve. The pilot valve may be actuated to control the pressure at which the relief valve opens, and the four-way valve may be actuated to render the relief valve inoperative when it is desired.

A further feature of the present invention resides in the provision of a relief valve including a movable piston which is subjected to hydraulic pressure on both ends thereof. The ends of the piston are of unequal area and the piston end having the largest area is arranged to normally hold the relief valve closed. A pilot valve is provided which is normally in series with the pressure line leading to the large diameter piston end. This pilot valve is capable of reducing the pressure acting upon the large diameter piston end when abnormal pressures are experienced. When the pressure drops on the large diameter piston end, the relief valve may be opened by the abnormal pressure acting upon the opposite or small diameter end thereof.

These and other objects and novel features of the present invention will be more clearly and fully set forth in the following specification and claims.

In the drawings forming a part of this specification:

Figure 1 is a diagrammatic view of the pressure relief system showing the general arrangement of parts therein.

Figure 2 is a sectional view through a control valve for controlling the flow of fluid pressure to the pilot valve and to the relief valve.

Figure 3 is a section on line 3—3 of Figure 1.

The pressure relief valve itself is generally indicated in the drawings by the numeral 10. The valve 10 includes a generally L-shaped housing 11 having a pressure inlet 12 and a fluid outlet 13, the inlet and outlet being arranged in right angular relation. A valve cylinder 14 is provided in the housing 11 in axial alignment with the pressure inlet 12. The cylinder 14 is designed to accommodate a valve element 15 having a closed end 16, the periphery of which is designed to seat against a suitable valve seat 17 forming a part of the housing 11 and encircling the pressure inlet 12.

A housing closure plate 19 is bolted or otherwise secured as indicated at 20 to the housing flange 21 at the end of the valve housing opposite the pressure inlet 12. The plate 19 is equipped with an axial sleeve 22 which is axially aligned with the pressure inlet 12. The sleeve 22 acts as a slide guide for the piston 15 as will be later described more in detail.

The valve element 15 includes an enlarged diameter end 23 of proper diameter to fit snugly within the cylinder 14. The cylinder 14 is of substantially greater internal diameter than the pressure inlet 12. A sealing ring 24 is provided in a peripheral groove 25 in the enlarged piston end 23 to form a fluid seal against the wall of the cylinder 14. The valve element 15 is provided with an axial bore or socket 26 which extends through the large diameter end of the piston and terminates adjacent the closed piston end 16. A spring 27 is interposed between the closed end 16 of the valve element 15 and plate 19 at the bottom of sleeve 22.

One or more apertures 30 are provided through the sleeve 22 near the closure plate 19 so that fluid pressure within the sleeve will be identical to that outside the sleeve. As a result, fluid pressure acting against the large diameter end of the valve element 15 may act against the end of the socket 26 as well as against the end of the enlarged diameter portion of the piston. Thus, the area on the left side of the valve element 15 is substantially greater than the area of the valve element subjected to pressure in the pressure inlet 12.

A four way valve 31 is provided to control the flow of fluid to the pressure relief valve 10. The valve 31 includes a housing 32 which supports a cylindrical rotary valve element 33. The housing 32 includes a cylindrical bore 34 in which the valve element 33 is rotatable. The ends of the valve element 33 are grooved as indicated at 35 and 36 to accommodate sealing rings 37 and 39, respectively, to prevent the leakage of fluid. The valve element 33 projects from one side of the housing 32 and is provided with an enlarged diameter head 40 which limits axial movement of the valve element in one direction. The other end of the valve element 33 also projects from the opposite end of the housing 32 and is axially socketed as indicated at 41 to accommodate an operating shaft 42. A handle 43 is provided on the shaft 42 by means of which the valve element may be rotated. The valve element 33 is also provided with a radially extending stop pin 44 which may serve to connect the shaft 42 to the valve element. One end of the pin 44 projects beyond the periphery of the cylindrical valve element 33 and is designed to engage stop pins 45 projecting from the housing 32 at angularly spaced points to limit rotating movement of the valve element. One of the stop pins 45 is indicated in Figure 2 of the drawings.

The valve element 33 is provided with a pair of fluid passages 46 and 47 which are designed to connect ports which are in right angular relation. The valve housing 32 is provided with four radially extending fluid passages 49, 50, 51 and 52. The passages 49 and 51 are aligned as are the passages 50 and 52. The valve element 33 may be rotated so that the passage 49 may be selectively connected either with the passage 50 or with the opposite passage 52, and at the same time the passage 51 connected either with the passage 52 or the opposed passage 50.

The valve structure also includes a pilot valve which is indicated in general by the numeral 53. The pilot valve 53 includes an end casting 54 and a second end plate 55 which are connected by a tubular enclosure 56. The end plate 55 is provided with an axial aperture 57 therein and a flexible diaphragm 59 is interposed between the end plate 55 and a cooperable end casting 60 which is connected to the end plate by any suitable means. The diaphragm 59 is clamped between the two parts when these parts are secured together by cap screws 48, one of which is shown in Figure 1.

An adjustment shaft 61 extends axially through the end plate 54 and is provided on its outer end with a handle or knob member 62 which is secured to the shaft to rotate therewith by a pin 63 or other suitable means. A collar or disc 64 is secured to the shaft 61 inwardly of the end plate 54 and is provided with angularly spaced peripheral notches 65. A ball 66 is spring urged against the notched outer surface of the collar 64 by means of a spring 67, the ball and spring being confined in a round hole 69 in end plate 54 by the tubular enclosure 56. Inwardly of the collar mounting, the reduced diameter portion 70 of the shaft 61 is externally threaded. An internally threaded sleeve 71 is mounted upon the threaded shaft portion 70 and this sleeve 71 is provided with a peripheral flange or shoulder 72 for a purpose which will be later described in detail.

A valve stem 73 extends through the center of the diaphragm 59 and a shoulder 74 encircling the stem 73 on one side of the diaphragm is located within an axial recess or socket 75 in the end casting 60. A bearing member 76 encircles the stem 73 on the opposite side of the diaphragm 59 and is held in place by a nut 77 which is threaded onto an end of the valve stem 73. The end of the valve stem 73 on one side of the diaphragm 59 extends through a guide passage 79 in the end casting 60 and into an enlargement 80 encircling the rod 73. The extremity of the valve rod 73 is tapered as indicated at 81 and fits against a similarly shaped valve seat 82 encircling an outlet passage 83 in the end casting 60. The pilot valve assembly is held together by long cap screws 58 which connect the end plates 54 and 55, 60. The tubular enclosure 56 is clamped between these plates. The flange 72 includes peripheral notches 68 to accommodate portions of the cap screws 58. Engagement of the bolts 58 in the notches 68 hold the flange 72 and sleeve 71 from rotation.

The bearing member 76 is of proper dimensions to slide within the aperture 57 in the end plate 55 and a spring 84 is interposed between the bearing member 76 and the flange 72 of the internally threaded sleeve 71. By rotation of the shaft 61, the sleeve 71 may be moved longitudinally of the threaded portion 70 of the shaft 61, therefore changing the compression of the spring 84. The shaft 61 is held in any adjusted position by engagement of the ball 66 with one of the grooves 65 of the collar 64.

The shaft 61 is provided with an extension 85 which extends into closely spaced relation with the end of the valve stem 73 and limits movement of this valve stem in one direction. Movement of the valve stem in the opposite direction is limited by engagement of the tapered end 81 with the valve seat 82.

A fluid port 86 is provided in the end casting 60 and this port 86 is connected through a suitable adaptor 87 and a tubular conduit 89 to the passage 50 of the valve housing 32. The passage 86 communicates with the interior of the socket 75 on one side of the diaphragm 59. The enlargement 80 or annular groove about the valve stem is connected by a passage 90 to an adapter 91 and tubular connector 92 leading to the passage 51 and the valve housing 32. A T-connector 93 is provided in the passage 89 and this T-connector is connected to a drain passage 94 controlled by a valve 95. The passage 83 in the end casting 60 accommodates an adapter 96 which connects this passage with a conduit 97 leading to an area of relatively low pressure. In other words, when the apparatus is used as the pressure relief valve in a centrifugal pump, the conduit 97 may lead to the intake of the pump.

To complete the system, the passage 52 of the valve housing 32 is connected by a conduit 99 to an adapter 100 leading through the closing plate 19 and into the interior of the cylinder 14 to the left of the valve element in the position illustrated in Figure 1 of the drawings. While the various tubular connections illustrated in the drawings are short in length, the relief valve 10 may, if desired, be located at a considerable distance from the four-way valve 31 and also from the pilot valve 53. The pilot valve is shown mounted upon a mounting panel 101 by suitable bolts such as 102 which extend into the end plate 54. The four-way valve 31 may have its operating shaft 41 also extending through this same panel 101 if it is so desired.

The operation of the apparatus is as follows:

The pressure relief valve 10 is subjected to fluid pressure in the pressure inlet 12, this pressure acting against the closed end 16 of the valve element 15. Pressure of the same value is supplied to the four-way valve 31 through the conduit 103 which is connected to the same source of liquid under pressure as is pressure inlet 12. With the valve element 31 in the position illustrated in Figure 1 of the drawings and with the drain valve 95 in closed position, this fluid under pressure flows through the conduit 89 and into the passage 86 leading to the axial recess 75 in the end casting 60 to subject one side of the diaphragm 59 to this fluid pressure. This pressure against the diaphragm 59 is normally over balanced by the force of the compression spring 84 so that the valve stem 73 is maintained with its tapered end 81 against the valve seat 82.

Fluid under pressure may bleed around the valve stem 73 and into the enlargement or chamber 80 which is connected by the passage 90 to the conduit 92. This conduit 92 is connected through the valve element 33 to the connection 99 leading to the interior of the cylinder 14 to the left of the valve element 15 in the particular arrangement illustrated. Thus, pressure is gradually built up on the left side of the valve element 15 which is identical to the pressure acting against the closed end 16 of the valve element. The larger area on the left side of the valve element 15, coupled with the force of the compression spring 27, normally holds the valve element 15 in closed position and against the valve seat 17 thus preventing the escape of liquid into the valve outlet 13.

In the event abnormal pressures are experienced, the liquid under pressure flows into the recess 75 on one side of the diaphragm 59 and overcomes the force of the spring 84 holding the valve stem 73 closed. As a result, the valve stem 73 is moved to the right, further compressing the spring 84.

Movement of the valve stem 73 to the right disengages the tapered end 81 of this valve stem from the seat 82 permitting the liquid in the chamber 80 to pass through the passage 97. This relieves the pressure in the conduit 92 and on the left side of the valve element 15 of the pressure relief valve 10. At the same time insufficient liquid bleeds from the recess 75 into the chamber 80 to permit the valve stem 73 to move back into closed position as long as the abnormal pressures are being experienced. In other words, the passages 103 and 89, as well as the passage through the valve element 33 and through the end casting 60, are so much larger than the confined space between the valve stem 73 and the walls of the casing that the valve stem remains in open position as long as the abnormal pressures are being experienced. As soon as the fluid pressure to the left of the valve element 15 is relieved, the abnormal pressures acting against the closed end 16 of the valve element 15 will compress the spring 27 permitting the valve element 15 to open and permit a by-pass of fluid under pressure until the abnormal pressures are relieved.

If it is desired to render the relief valve 10 inoperative so that it will not act in its normal capacity, it is only necessary to turn the valve element 33 of the four-way valve 31 into a position where the pressure inlet 103 is connected to the valve passage 52 leading to the connection 99 and to the interior of the cylinder 14 to the left of the valve element 15. When the four-way valve is in this position, both sides of the valve element 15 are subjected to the same pressure but as the area on the left end of this valve element is much greater than the area of the closed end 16, the valve will be held closed under any pressure conditions.

In accordance with the patent statutes, we have described the principles of construction and operation of our relief valve, and while we have endeavored to set forth the best embodiments thereof, we desire to have it understood that obvious changes may be made within the scope of the following claim without departing from the spirit of our invention.

We claim:

A remote control operated relief valve structure including a relief valve housing having an inlet and an outlet, a movably supported valve element within said housing and normally closing said inlet, a remotely located pilot valve including a pilot valve housing, a first fluid chamber and a second fluid chamber within said pilot valve housing, means connecting the first pilot valve chamber to said relief valve inlet, means connecting said second fluid chamber to said relief valve housing to subject one side of said movably supported valve element therein to substantially the same pressure as that existing in said second fluid chamber, the other side of said valve element in said relief valve housing being subjected to relief valve inlet pressure and being of less area than said one side thereof, said second fluid chamber having an outlet, a pilot valve element movably supported in said pilot valve housing and operable to close said second fluid chamber outlet, resilient means normally urging said pilot valve element into outlet closing position, fluid pressure in said first fluid chamber urging said pilot valve element into outlet opening position and operable when said first fluid chamber is subjected to abnormal pressures to operate said pilot valve element to open said second fluid chamber outlet, and a bleed passage between said chambers, whereby fluid pressure on opposite sides of said relief valve element normally holds this relief valve element closed, and whereby opening of said pilot valve element by an abnormal pressure relieves pressure on one side of said relief valve element whereby this element will open, and valve means in said means connecting said first chamber to said relief valve inlet and in said means connecting said second fluid chamber to said relief valve housing operable to disconnect said second fluid chamber from said relief valve and to connect said relief valve housing at a point in said one side of said valve element directly to said relief valve inlet.

References Cited in the file of this patent

UNITED STATES PATENTS

| | | |
|---|---|---|
| 2,007,554 | Westerberg | July 9, 1935 |
| 2,587,212 | Placette | Feb. 26, 1952 |